(12) United States Patent
Shibata

(10) Patent No.: US 10,380,450 B2
(45) Date of Patent: Aug. 13, 2019

(54) INFORMATION PROCESSING DEVICE, INFORMATION PROCESSING METHOD, AND RECORDING MEDIUM

(71) Applicant: NEC Corporation, Minato-ku, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 193 days.

(21) Appl. No.: 15/511,707

(22) PCT Filed: Sep. 17, 2015

(86) PCT No.: PCT/JP2015/004748
§ 371 (c)(1),
(2) Date: Mar. 16, 2017

(87) PCT Pub. No.: WO2016/051707
PCT Pub. Date: Apr. 7, 2016

(65) Prior Publication Data
US 2017/0293821 A1 Oct. 12, 2017

(30) Foreign Application Priority Data
Oct. 3, 2014 (JP) .................................. 2014-205007

(51) Int. Cl.
*G06K 9/46* (2006.01)
*G06T 7/00* (2017.01)
(Continued)

(52) U.S. Cl.
CPC ................. *G06K 9/46* (2013.01); *G06T 7/00* (2013.01); *G06T 7/33* (2017.01); *G06T 7/50* (2017.01)

(58) Field of Classification Search
CPC .... G06K 9/46; G06T 7/33; G06T 7/50; G06T 7/00
See application file for complete search history.

(56) References Cited

U.S. PATENT DOCUMENTS

| | | | |
|---|---|---|---|
| 8,401,333 B2 * | 3/2013 | Miyakawa | G06T 5/50 382/284 |
| 2008/0180535 A1 * | 7/2008 | Habuka | G06T 7/20 348/208.4 |

(Continued)

FOREIGN PATENT DOCUMENTS

| | | |
|---|---|---|
| JP | H11-175729 A | 7/1999 |
| JP | 2009-053916 A | 3/2009 |

(Continued)

OTHER PUBLICATIONS

B. D. Lucas and T. Kanade, "An iterative image registration technique with an application to stereo vision", Proceedings of DARPA Imaging Understanding Workshop, pp. 121-130, Apr. 1981.

(Continued)

*Primary Examiner* — Menatoallah Youssef

(57) ABSTRACT

An information processing device according to the present invention includes: a feature point sampling unit that generates, based on an initial value of a feature point used for registration of an object included in a target image to be processed, a feature point hypothesis that is a group of a plurality of the feature points in the target image; an image degradation unit that generates a degraded image that is a degraded image with degrading a reference image used for processing the target image, based on the feature point hypothesis and a degradation parameter for degrading an image; and a reliability calculation unit that calculates a reliability of the feature point hypothesis, based on the target image, the degraded image, and the feature point hypothesis.

7 Claims, 14 Drawing Sheets

(51) Int. Cl.
*G06T 7/33* (2017.01)
*G06T 7/50* (2017.01)

(56) References Cited

U.S. PATENT DOCUMENTS

| | | | |
|---|---|---|---|
| 2009/0060290 A1 | 3/2009 | Sabe et al. | |
| 2009/0110303 A1 | 4/2009 | Nishiyama et al. | |
| 2015/0371388 A1* | 12/2015 | Ishida | G06T 17/20 |
| | | | 382/294 |

FOREIGN PATENT DOCUMENTS

| | | |
|---|---|---|
| JP | 2009-110349 A | 5/2009 |
| JP | 2009-300230 A | 12/2009 |
| WO | 2012/063468 A1 | 5/2012 |

OTHER PUBLICATIONS

T. F. Cootes, C. J. Taylor, D.H. Cooper, and J. Graham, "Active Shape Models—Their Training and Application", Computer Vision and Image Understanding, vol. 61, Issue 1, pp. 38-59, Jan. 1995.
International Search Report for PCT Application No. PCT/JP2015/004748, dated Dec. 8, 2015.
English translation of Written opinion for PCT Application No. PCT/JP2015/004748.

\* cited by examiner

Fig.10  ✦ : SAMPLING POINT

INFORMATION PROCESSING DEVICE, INFORMATION PROCESSING METHOD, AND RECORDING MEDIUM

This application is a National Stage Entry of PCT/JP2015/004748 filed on Sep. 17, 2015, which claims priority from Japanese Patent Application 2014-205007 filed on Oct. 3, 2014, the contents of all of which are incorporated herein by reference, in their entirety.

TECHNICAL FIELD

The present invention relates to image processing, and more particularly, to an information processing device, an information processing method, and a recording medium, for performing a process for image registration.

BACKGROUND ART

Image processing includes image recognition processing for recognizing an object in an image. In this case, however, image capturing processing includes a degradation such as noise during capturing. Accordingly, the image recognition may require image restoration processing in some cases (e.g., see PTL 1). An example of the restoration processing is a learning-based super-resolution technique.

When the image recognition or the learning-based super-resolution is performed on an object in an image, an image processing device for processing an image calculates geometric transformation between a posture of an object in an input image and a posture of a captured object in a reference image. This processing is generally called "image registration (hereinafter also referred to simply as "registration")". Lucas-Kanade method (e.g., see NPL 1) is known as an image registration method. The Lucas-Kanade method is a method for registration of images. In the method, sum of squares of differences between pixel values of the object in the input image and pixel values in the reference image in which the image registration is performed, is minimized. In the Lucas-Kanade method, positions having the minimized sum are calculated by a gradient method. However, the Lucas-Kanade method is based on a premise that, for example, the input image and the reference image are substantially the same images like adjacent frames in a video footage. Accordingly, the Lucas-Kanade method cannot be applied when a resolution or a pattern (e.g., a variation of the number of license plates) of the input image is considerably different from that of the reference image.

Thus, there is an issue that the techniques described in PTL 1 and NPL 1 cannot be applied when there are many variations of patterns in the input image and the reference image, like images captured by a surveillance camera.

In this regard, an AAM (Active Appearance model) has been proposed (e.g., see PTL 2 and NPL 2) as a method capable of performing registration of images even when there are variations of image patterns. The AAM learns a distribution of variations of patterns from a plurality of reference images by using a principal component analysis. The AAM approximates the variation distribution with, for example, an anisotropic Gaussian distribution. Thus, the AAM is a method of simultaneously performing registration of the reference image and the input image and estimation of patterns.

CITATION LIST

Patent Literature

[PTL 1] Japanese Laid-open Patent Publication No. 2009-110349

[PTL 2] Japanese Laid-open Patent Publication No. 2009-053916

Non Patent Literature

[NPL 1] B. D. Lucas and T. Kanade, "An iterative image registration technique with an application to stereo vision" Proceedings of DARPA Imaging Understanding Workshop, pp. 121-130, April 1981.

[NPL 2] T. F. Cootes, C. J. Taylor, D. H. Cooper, and J. Graham, "Active Shape Models-Their Training and Application", Computer Vision and Image Understanding, Vol. 61, Issue 1, pp. 38-59, January 1995

SUMMARY OF INVENTION

Technical Problem

However, the techniques described in PTL 2 and NPL 2 have an issue that it is not achieved to realize high accuracy registration when a low-resolution image, a compressed image, or an image with a lot of noise is used, or there are many variations of captured objects, like an image of a surveillance camera, for example.

This is because the AAM is based on the following two conditions.

(1) Patterns can be approximated with an anisotropic Gaussian distribution; and (2) A pattern distribution of the reference image and a pattern distribution of the input image are the same.

For example, low-resolution images captured by a surveillance camera do not satisfy the two conditions in many cases. Unlike face images, variations of patterns of license plate images cannot be approximated with an anisotropic Gaussian distribution. The reference image is generally a high-definition image. Contrary to the reference image, the input image captured by a surveillance camera includes a blur, compression noise, or the like. Accordingly, the pattern distribution of the reference image is greatly different from the pattern distribution of the input image. Therefore, the AAM described in PTL 2 and NPL 2 has a problem that it is not achieved to realize high accuracy registration when a low-resolution image, a compressed image, or an image with a lot of noise is used, or there are many variations of patterns of captured objects, like an image of a surveillance camera, for example.

An object of the present invention is to solve the above-mentioned problems and provide an information processing device, an information processing method, and a recording medium which are capable of performing high accuracy registration even when a low-resolution image, a compressed image, or an image with a lot of noise is used, or there are many variations of patterns of captured objects.

Solution to Problem

An information processing device according to one aspect of the present invention includes: a feature point sampling unit that generates, based on an initial value of a feature point used for registration of an object included in a target image to be processed, a feature point hypothesis that is a group of a plurality of the feature points in the target image; an image degradation unit that generates a degraded image that is a degraded image with degrading a reference image, based on the feature point hypothesis and a degradation parameter for degrading an image; and a reliability calculation unit that calculates a reliability of the feature point hypothesis, based on the target image, the degraded image, and the feature point hypothesis.

An information processing method according to one aspect of the present invention includes: based on an initial value of a feature point used for registration of an object included in a target image to be processed, generating a feature point hypothesis that is a group of a plurality of the feature points in the target image; generating a degraded image that is a degraded image with degrading a reference image used for processing the target image, based on the feature point hypothesis and a degradation parameter for degrading an image; and calculating a reliability of the feature point hypothesis, based on the target image, the degraded image, and the feature point hypothesis.

A non-volatile computer-readably recording medium according to one aspect of the present invention embodying a program. The program causes a computer to to perform a method. The method includes: based on an initial value of a feature point used for registration of an object included in a target image to be processed, generating a feature point hypothesis that is a group of a plurality of the feature points in the target image; generating a degraded image that is a degraded image with degrading a reference image used for processing the target image, based on the feature point hypothesis and a degradation parameter for degrading an image; and calculating a reliability of the feature point hypothesis, based on the target image, the degraded image, and the feature point hypothesis.

Advantageous Effects of Invention

According to the present invention, it is possible to provide an advantageous effect of achieving high accuracy registration even when a low-resolution image, a compressed image, or an image with a lot of noise is used, or there are many variations of patterns of captured objects.

DESCRIPTION OF EMBODIMENTS

Figure 1:
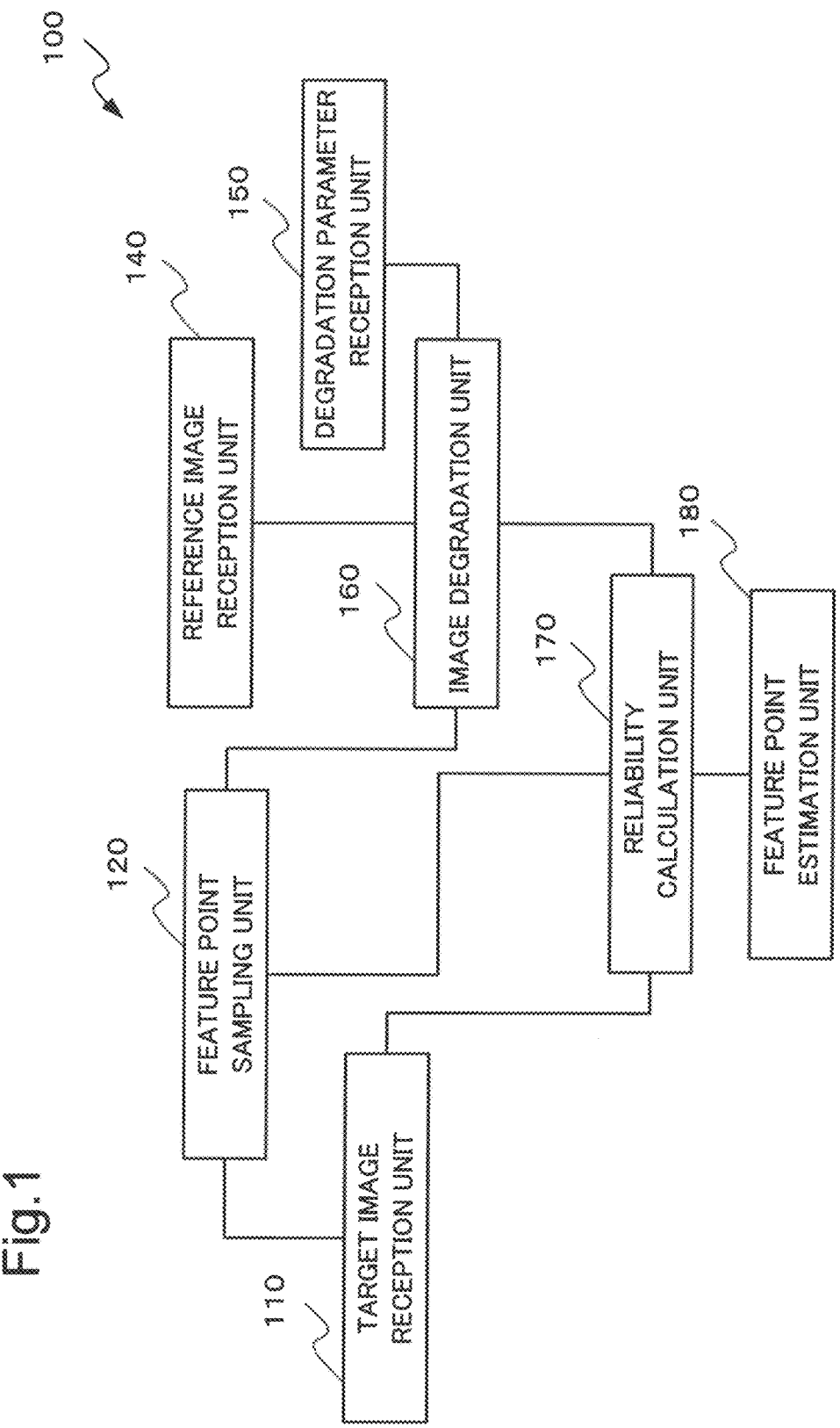
FIG. 1 is a block diagram illustrating an example of a configuration of an information processing device according to a first example embodiment of the present invention.

Next, example embodiments of the present invention will be described with reference to the drawings.

Not that the drawings illustrate example embodiments of the present invention. However, the present invention is not limited to the illustration of the drawings. The similar element in the drawings is denoted by the same reference number, and repeated descriptions thereof may be omitted.

In the drawings used in the following description, descriptions of configurations that are not relevant to the description of the present invention are omitted, and the illustration thereof may be omitted.

First, the terms used for explaining example embodiments are listed below.

The term "target image" refers to an image to be processed in the description of example embodiments. The target image is, for example, a low-resolution image, a compressed image, or an image with a lot of noise, which are captured by a surveillance camera.

The term "reference image" refers to an image used as a reference in the processing of each example embodiment. In the following description, a plurality of reference images are used in the example embodiments of the present invention. However, this is not intended to exclude a case where one reference image is used in the example embodiments of the present invention.

The term "degraded image" refers to an image acquired by degrading the reference image. The degradation of the image will be described in detail later.

The term "feature point" refers to a candidate point for registration using the target image and the degraded image (or the reference image) in registration processing. The registration is executed using an outer shape (contour) of an object or a characteristic shape included in the object. The feature points are, for example, vertices of a polygon. Accordingly, assume hereinafter that, for example, in each example embodiment, a polygon is used as a shape of a contour of an object and the vertices of the polygon are used as the feature points. However, in each example embodiment of the present invention, not only the vertices of a polygon, but also other points may be used as the feature points. For example, when the object is the face or eyes of a person, in an example embodiment of the present invention, the contour shape of the object may be assumed as a circle or an ellipse and points determining the shape of the circle or ellipse may be used as the feature points. For example, in the case of an elliptical shape, in an example embodiment of the present invention, four points including two intersections between the major axis and the outer periphery and two intersections between the minor axis and the outer periphery may be used as the feature points. Alternatively, when the object is a circuit substrate, in an example embodiment of the present invention, the outer shape (contour) of a characteristic element included in the object (substrate) may be used as a feature point.

The term "feature point hypothesis" refers to a combination of the feature points which become a hypothesis. When the object is a polygon, a combination of the feature points is a combination of candidate points (e.g., a combination of vertices) of object for restoration in the polygon. A combination of vertices of the polygon represents the contour of the object. As described above, this example embodiment is described by using a polygon. Accordingly, in the following description, the feature point hypothesis represents the vertices on the contour of the polygon which is the object. However, the feature point hypothesis in this example embodiment is not limited to the vertices on the contour of a polygon.

The term "class" refers to a category of images in the description of this example embodiment. Specifically, the target images and the like are classified as a predetermined class.

The term "$L_p$ distance" refers to a p-th power average norm of Lebesgue spaces. For example, in n dimensions, the $L_p$ distance is represented by $(|x_1|^p+|x_2|^p+ \ldots +|x_n|^p)^{1/p}$ if coordinates are assumed $(x_1, x_2, \ldots, x_n)$.

First Example Embodiment

Next, a first example embodiment of the present invention will be described with reference to the drawings.

[Description of Configuration]

FIG. 1 is a block diagram illustrating an example of a configuration of an information processing device 100 according to the first example embodiment of the present invention.

The information processing device 100 includes a target image reception unit 110, a feature point sampling unit 120, a reference image reception unit 140, a degradation parameter reception unit 150, an image degradation unit 160, a reliability calculation unit 170, and a feature point estimation unit 180.

Note that the information processing device 100 may include a storage unit which is not shown. In this case, each of above-mentioned units included in the information processing device 100 may store information (image data, parameters, etc.) described below in the storage unit which is not shown, or may read out information from the storage unit. Note that in the following description, the description of the operation to the storage unit from each unit is omitted. However, it is not intended to exclude the operation for storing information in the storage unit and the operation for reading out information from the storage unit.

The target image reception unit 110 receives an image (target image) which is a target of an operation for estimating feature points. Note that when processing the target image previously stored in the storage unit which is not shown, the information processing device 100 need not include the target image reception unit 110.

The feature point sampling unit 120 preliminarily stores initial values at positions of feature points (vertexes of a contour) relating to the target image (hereinafter also referred to simply as "initial values"), or estimates (determines) them. The feature point sampling unit 120 may store, for example, feature points previously set by a user of the information processing device 100 as the initial values. Alternatively, the feature point sampling unit 120 may estimate (determine) the initial values of feature points by tentatively applying a general technique, such as the AAM, to the target image. Alternatively, the feature point sampling unit 120 may preliminarily store a number of feature points less than the necessary number of feature points for forming a contour as the initial values, and may estimate the other necessary feature points as the initial values.

In the following description of this example embodiment, for example, it is assumed that the feature point sampling unit 120 stores the initial values of features point set by a user in advance.

Next, the feature point sampling unit 120 samples (selects), as feature point of each of the vertices, a predetermined number of a plurality of pixels at predetermined positions in the vicinity of each initial value with accuracy of a pixel accuracy or a sub-pixel accuracy (accuracy finer than that of pixels) based on the initial values of the feature points. The sampled feature point is hereinafter referred to as a "sampling point." Further, the feature point sampling unit 120 generates, as a group of feature points as a hypothesis (feature point hypothesis), a group of feature points (feature point hypothesis) which are combined with the feature points of the vertices of a predetermined shape so as to be the contour of the predetermined shape. Note that, in the following description, the feature point hypothesis is distinguished using a suffix "1". The generation of the feature point hypothesis is also referred to as "sampling of feature point hypothesis".

Figure 10:
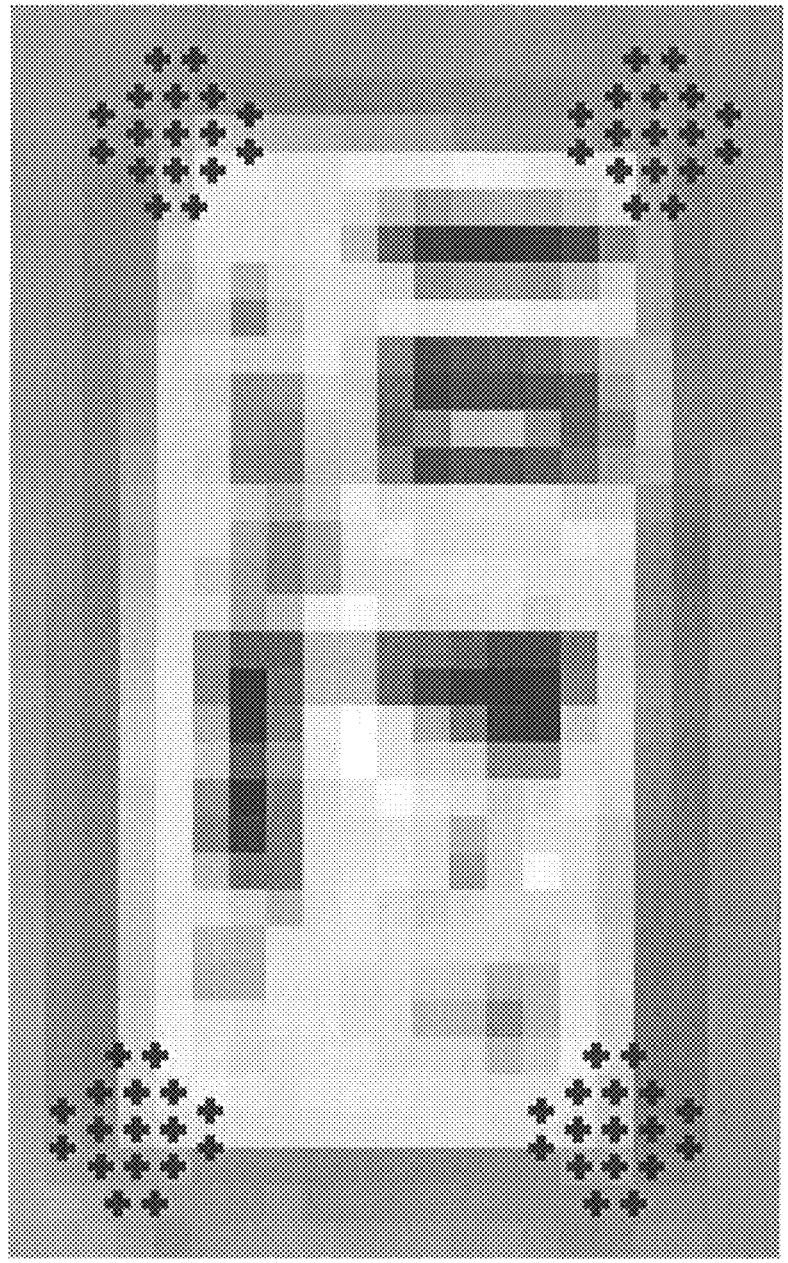
FIG. 10 is a diagram illustrating an example of sampling points.

FIG. 10 is a diagram illustrating an example of sampling points.

Figure 11:
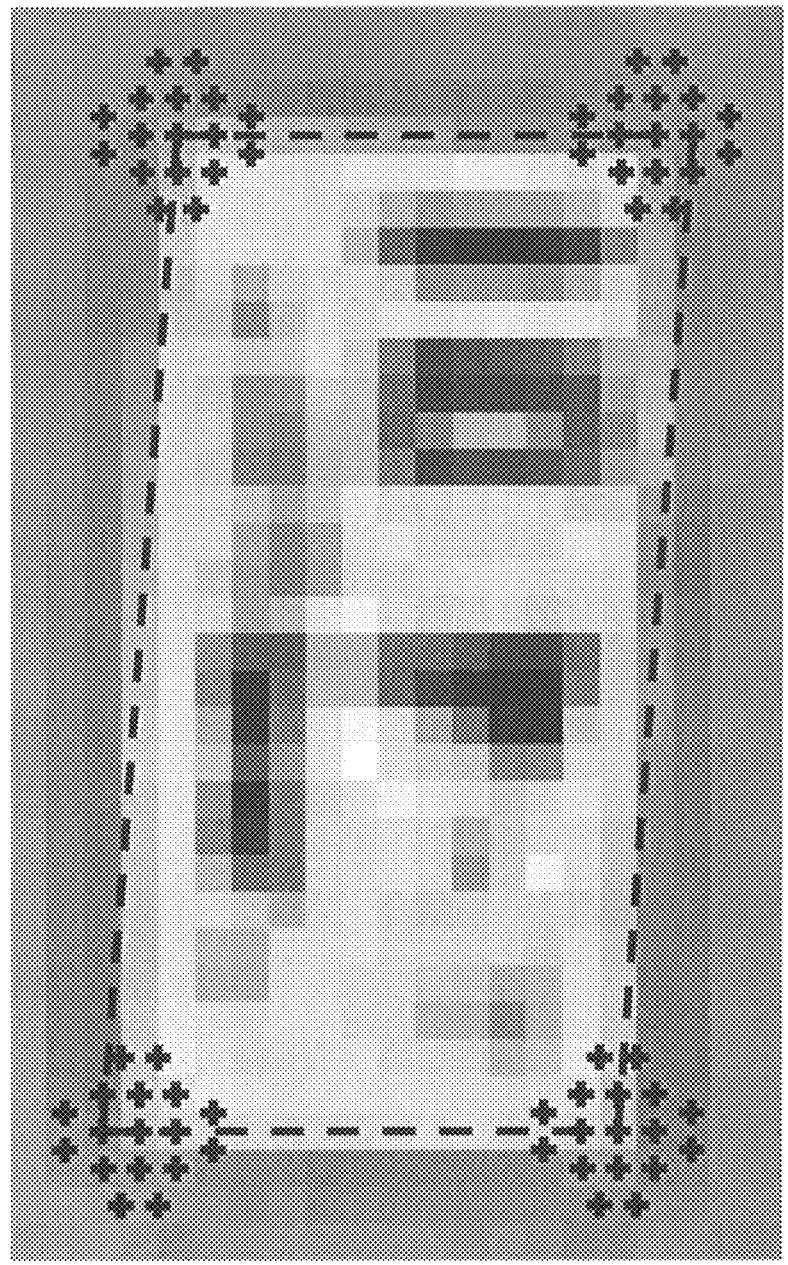
FIG. 11 is a diagram illustrating an example of a feature point hypothesis.

FIG. 11 is a diagram illustrating an example of the feature point hypothesis.

The reference image reception unit 140 receives a plurality of reference images used for estimating the feature points. Note that when using the reference images preliminarily stored in the storage unit which is not shown, the information processing device 100 need not include the reference image reception unit 140.

The degradation parameter reception unit 150 receives a degradation parameter used by the image degradation unit 160 to be described later. The degradation parameter reception unit 150 is not limited the scope of the received degradation parameter. For example, when the image degradation unit 160 preliminarily stores some of the degradation parameters to be used, the degradation parameter reception unit 150 may receive the remaining degradation parameters. Alternatively, the degradation parameter reception unit 150 may receive all the degradation parameters and transmit them to the image degradation unit 160. Note that, when the image degradation unit 160 preliminarily stores all the degradation parameters, the information processing device 100 need not include the degradation parameter reception unit 150.

The type of the received degradation parameter is not particularly limited. For example, as the received degradation parameter, a resolution of an image, a point spread function representing the extent of focus blur or motion blur of an image, an amount of compression of an image, or an amount of noise in an image is assumed. Alternatively, the degradation parameter reception unit 150 may receive, in addition to the above degradation parameters, a degradation parameter representing an image compression method such as an interlacing process, or a change in lightness due to blown out highlights, blocked up shadows, or the like.

The image degradation unit 160 generates an image by degrading the reference image based on the feature point hypothesis sampled by the feature point sampling unit 120, the reference image received by the reference image reception unit 140, and the degradation parameter received by the degradation parameter reception unit 150. The image acquired by degrading the reference image is hereinafter referred to simply as a "degraded image". The image degradation unit 160 desirably generates the degraded image by using a group of degradation parameters. However, the image degradation unit 160 may generate the degraded image by using each of the degradation parameters, separately.

Further, the image degradation unit 160 desirably generates the degraded image for all of the reference images. However, the image degradation unit 160 need not generate the degraded image for some of the reference images. For example, when a reference image that is obviously different from the target image is included, the image degradation unit 160 need not generate the degraded image for the reference image.

Further, the image degradation unit 160 desirably generates the degraded image by using all groups of degradation parameters for the reference images. However, the image degradation unit 160 need not generate the degraded image for some of the combination of the reference images and the group of degradation parameters.

The method for generating the degraded image by using degradation parameters in the image degradation unit 160 is not particularly limited. For example, the image degradation unit 160 may use a degradation process model Y as represented by the following Equation 1 so as to simulate compression noise, interlacing, and a change in lightness based on the degradation parameters.

$$Y = G_p(C_{cr}(D_f(B_\sigma \cdot W_H \cdot X))) + N \qquad \text{[Equation 1]}$$

In Equation 1, a vector X is a column vector in which pixel values (e.g., brightness values) of the reference image (high resolution image) are arranged in a raster-scan order.

A matrix $W_H$ is a matrix representing an image deformation based on a posture, and a matrix $B_\sigma$ is a matrix representing a blur. For example, the image degradation unit 160 may use the matrix $B_\sigma$ that is approximated with a Gaussian filter having a width of a standard deviation σ [in units of pixel], as the blur. Alternatively, the image degradation unit 160 may also use a homography (H) representing a posture transformation calculated based on each feature point, as the matrix $W_H$ representing an image deformation. The vector N is a column vector representing noise.

A function $D_f(\cdot)$ is a down sampling function in consideration of interlacing; a function $C_{cr}(\cdot)$ is a function for performing compression (jpeg compression); and a function $G_p(\cdot)$ is a function for changing lightness.

Each of the functions is, for example, a function as follows.

The down sampling function $D_f(\cdot)$ is a function for executing down sampling as described below as a compression method relating to a degradation parameter. For example, when the target image is an image cut from a progressive video, the function $D_f(\cdot)$ executes down sampling by a method similar to general down sampling. When the target video is an image cut from an interlacing video, the function $D_f(\cdot)$ may operate as follows. That is, the function $D_f(\cdot)$ executes general down sampling in an odd-numbered field. On the other hand, the function $D_f(\cdot)$ executes, in an even-numbered field, linear interpolation using pixels of odd-numbered fields (odd-numbered fields adjacent to upper and lower of the even-numbered field). Alternatively, on the contrary, the function $D_f(\cdot)$ executes general down sampling in an even-numbered field. Then, the function $D_f(\cdot)$ may execute, in an odd-numbered field, linear interpolation using pixels of even-numbered fields (even-numbered fields adjacent to upper and lower of the odd-numbered field). However, the compression method in the image degradation unit 160 is not limited to the above-described methods, but instead, another method may be used.

The compression function $C_{cr}(\cdot)$ is a function for generating a quantization matrix Q' by converting the values of a quantization matrix Q, which is a standard and shown in the following Equation 2, in accordance with the value of a suffix cr, and compressing the image by using the quantization matrix Q and the quantization matrix Q'. Note that cr represents a value indicating the amount of compression. The range of cr is from −1 to 1 (cr∈[−1,1]).

$$Q = \begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix} \qquad \text{[Equation 2]}$$

if $cr > 0$
$$Q' = \max[Q(1-cr), \; 1]$$
else
$$Q' = 255 - (255 - Q)(1 + cr)$$

In Equation 2, "max[Q,1]" represents processing for replacing an element smaller than 1 by 1 for each component (each element) of the matrix Q. "Q(1−cr)" represents a multiplication of each element of the matrix Q by (1−cr). That is, in case of cr>0, each element of the matrix Q' is a value acquired by multiplying the element of the matrix Q by (1−cr) and replacing the element which is smaller than 1 by 1.

"(255−Q)" represents a value acquired by subtracting each element of the matrix Q from "255". That is, in case of cr≤0 (not cr>0), each element of the matrix Q' is a value acquired by multiplexing the value subtracting the element of the matrix Q from "255" by (1+cr) and subtracting the value of the result of the multiplication from "255".

After generation of the matrix Q', the function $C_{cr}(\cdot)$ multiplies an argument vector (pixel value vector) by an inverse matrix of the matrix Q', rounds off the first decimal places of the value of the element in the vector which is a result of the multiplication to make the value of the element integer, and further multiplies the resultant vector by the matrix Q.

The lightness change function $G_p(\cdot)$ executes y-correction for each component of the argument vector in accordance with the value of a suffix p. Here, the suffix p of the function $G_p(\cdot)$ is a suffix for distinguishing a region for which the appearance difference is calculated. Specifically, p is p∈P (a set of all regions for which the appearance difference is calculated). For example, specifically, when the value of each element of the vector is x and the suffix is p (region p), a value (y) of each element of the vector after converted using the function $G_p(\cdot)$ is calculated as shown in the following Equation 3.

$$y = x^{2^p} \qquad \text{[Equation 3]}$$

Note that the image degradation unit 160 generates a number of degradation images corresponding to the number of combinations of the feature point hypothesis and the reference image. For example, when the number of reference images is represented by M and the number of feature point hypotheses is represented by L, the image degradation unit 160 generates M×L degraded images. Further, when a plurality of combinations of degradation parameters is present, the image degradation unit 160 generates, in addition to the above-mentioned combinations, degraded images relating to the combinations of degradation parameters.

For example, when, in addition to the above-mentioned combinations, U combinations of degradation parameters are present, the image degradation unit 160 generates M×L×U degraded images.

However, the image degradation unit 160 may generate degraded images whose number is less than the number of the above degraded images.

The reliability calculation unit 170 calculates a reliability of the feature point hypothesis (hereinafter referred to as "integration reliability") based on the target image, the degraded image, and the feature point hypothesis.

Figure 2:
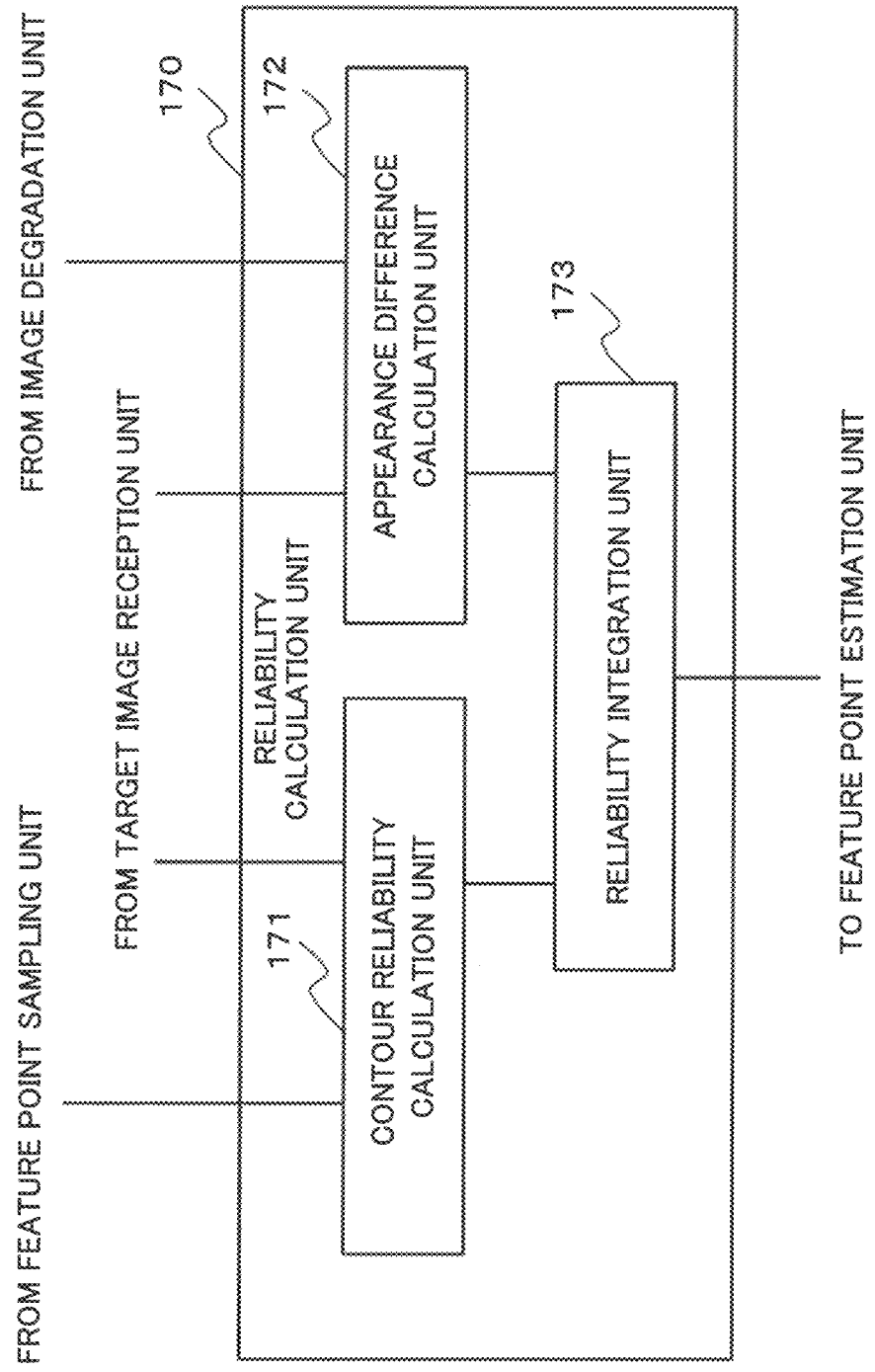
FIG. 2 is a block diagram illustrating an example of a configuration of a reliability calculation unit according to the first example embodiment.

FIG. 2 is a block diagram illustrating an example of the configuration of the reliability calculation unit 170.

The reliability calculation unit 170 includes a contour reliability calculation unit 171, an appearance difference calculation unit 172, and a reliability integration unit 173. However, the configuration of the reliability calculation unit 170 is not limited to this. For example, the reliability calculation unit 170 may include one of the contour reliability calculation unit 171 and the appearance difference calculation unit 172. In other words, the reliability calculation unit 170 may output, as the integration reliability, a contour reliability or an appearance difference as described later.

The contour reliability calculation unit 171 calculates a reliability when the feature point hypothesis of an object is considered to a contour (frame) (hereinafter referred to as "contour reliability"). The term "contour" refers to a contour included in a target image. For example, when the object captured as a target image is a face, the contour of a cheek, an edge of an eye, or the like is defined as a contour. Alternatively, when the captured object is a license plate, an outer frame of the license plate is defined as a contour.

The method for calculating the reliability by the contour reliability calculation unit 171 is not particularly limited. For example, the contour reliability calculation unit 171 may use the following method. First, the contour reliability calculation unit 171 detects edges by applying a sobel filter to the received target image and the degraded image. Further, the contour reliability calculation unit 171 calculates edge intensities based on the detected edges. Then, the contour reliability calculation unit 171 integrates the edge intensities on a hypothetical straight line along the contour. The contour reliability calculation unit 171 may use the integral value of the edge intensities as the reliability of the contour.

For example, a case where a captured object is an image of a license plate will be described with reference to the drawings.

Figure 12:
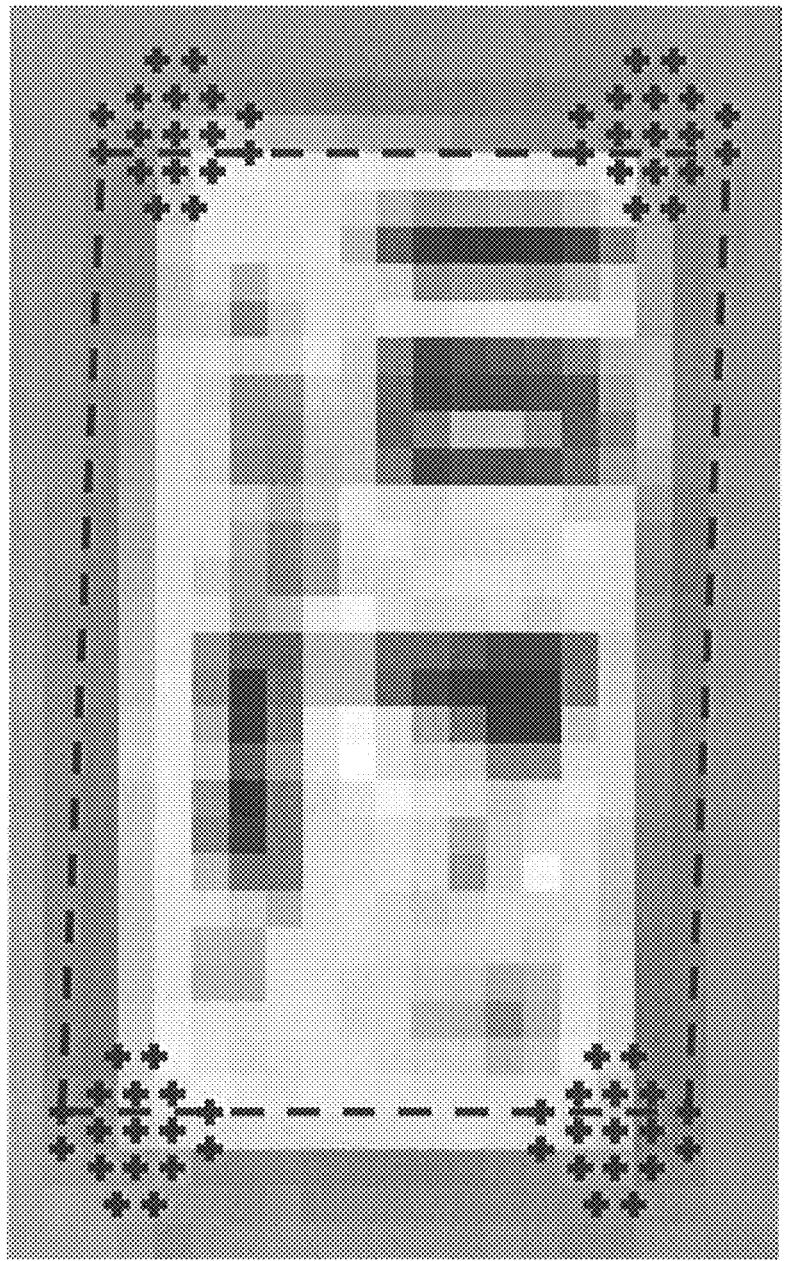
FIG. 12 is a diagram illustrating an example of a feature point hypothesis when a contour reliability is low.

FIG. 12 is a diagram illustrating an example of the feature point hypothesis when the contour reliability is low.

Figure 13:
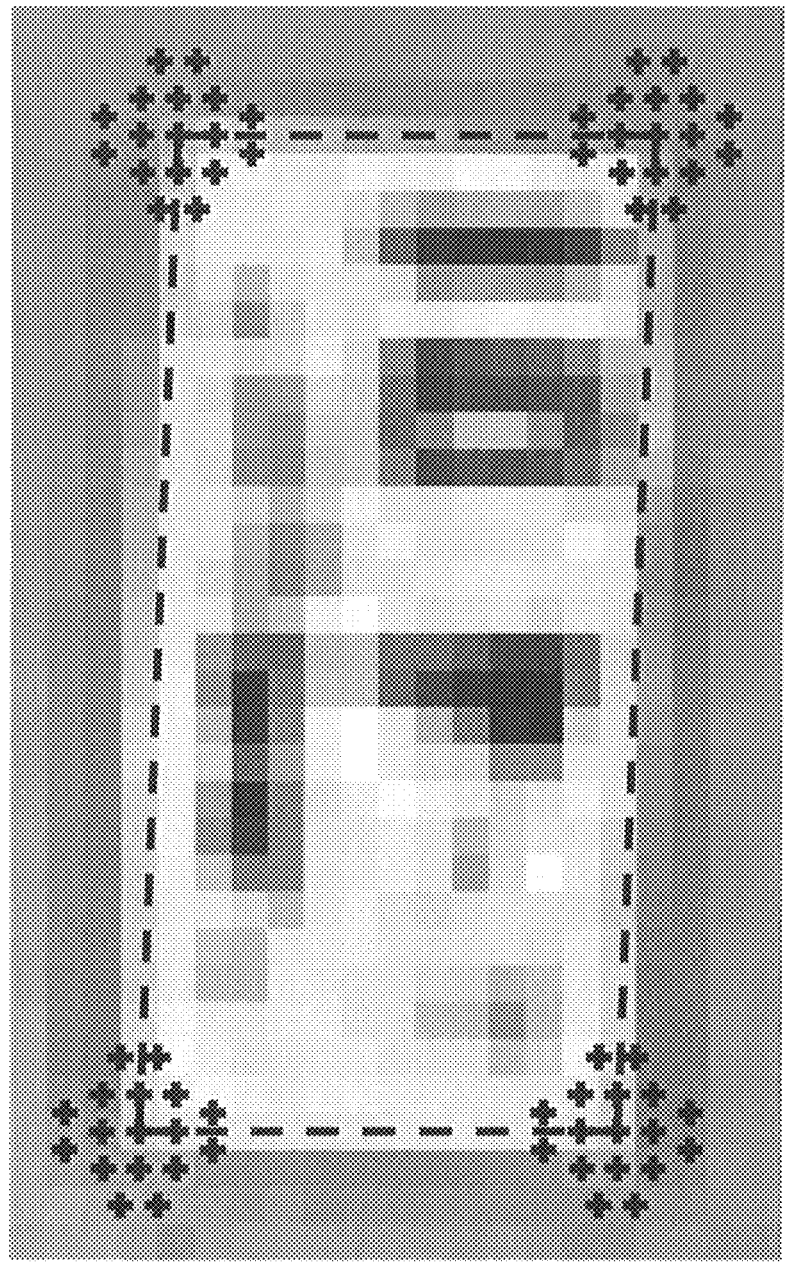
FIG. 13 is a diagram illustrating an example of a feature point hypothesis when the contour reliability is high.

FIG. 13 is a diagram illustrating an example of the feature point hypothesis when the contour reliability is high.

In the case shown in FIG. 12, a change of brightness in the feature point hypothesis, that is, the contour (e.g., the frame of the license plate) is small. In other words, the edge intensities on the contour are small. Accordingly, in the case shown in FIG. 12, the integral value of the edge intensities is small.

On the other hand, in the case shown in FIG. 13, a change of brightness in the feature point hypothesis, that is, the contour is large. In other words, the edge intensities on the contour are large. Accordingly, in the case shown in FIG. 13, the integral value of the edge intensities is large.

In this case, when "s" represents a line element; a function f(s) is a function representing the edge intensity of a target image; and "ds" represents a small line element on the contour, an integral value $T_1$ relating to a feature point hypothesis 1 is represented by the following Equation 4.

$$T_l = \int f(s) ds \quad \text{[Equation 4]}$$

The contour reliability calculation unit 171 may calculate an integral value $T_1$ by integrating the function f(s).

Note that the contour reliability calculation unit 171 may use a method other than the sobel filter as the method for calculating the edge intensity. For example, the contour reliability calculation unit 171 may use a Canny method.

Further, the contour reliability calculation unit 171 calculates a contour reliability $S_1$ by normalizing the integral value $T_1$ of the feature point hypothesis by using a Z-value (Z-test using a normal distribution). The contour reliability $S_1$ is calculated as shown in the following Equation 5.

$$S_l = \frac{T_l - \frac{1}{L}\sum_l T_l}{\sqrt{\frac{1}{L}\sum_k \left(T_k - \frac{1}{L}\sum_l T_l\right)^2}} \quad \text{[Equation 5]}$$

The appearance difference calculation unit 172 calculates a difference of an appearance of an object in the degraded image and the target image based on the degraded image and the target image. The appearance difference calculation unit 172 calculates the appearance difference for combinations of the target image and all degraded images.

The appearance difference calculation unit 172 will be described in more detail. Also in the following description, the target image is assumed the image of the license plate. However, this example embodiment is not limited to this. Further, in the following description, the reference image is distinguished by using a suffix "m".

The appearance difference calculation unit 172 calculates the appearance difference between the target image and the degraded image in predetermined regions of the target image. The appearance difference is a difference of appearance. For example, the appearance difference calculation unit 172 may calculate the appearance difference by using an $L_2$ distance which is a difference between feature vectors extracted from each of the predetermined regions in the target image and the degraded image. Alternatively, the appearance difference calculation unit 172 may calculate the appearance difference by using an $L_1$ distance or KL (Kullback-Leibler) distance which is a difference between feature vectors extracted from each of the predetermined regions in the target image and the degraded image.

In the following description, a normalized cross-correlation is used as an example of the feature vectors extracted from the image used for calculation of the appearance difference. However, this example embodiment is not limited to this.

In the following description, "R" is used as a suffix for distinguishing a region for which the feature vector is calculated. The feature vector extracted from each region by the appearance difference calculation unit 172 is represented by $F_{lm}^R$. At this time, the appearance difference calculation unit 172 selects a minimum feature vector $F_{lm}^R$ from among all the degraded images for each region in the degraded images. Further, the appearance difference calculation unit 172 may set the sum of the selected feature vectors $F_{lm}^R$ as an appearance difference $F_l$ for each feature point hypothesis 1. This is expressed by the following Equation 6.

$$F_l = \sum_R D_l^R = \sum_R \left\{ \min_m F_{lm}^R \right\} \quad \text{[Equation 6]}$$

Each $D_l^R$ shown in Equation 6 is represented by the following Equation 7.

$$D_l^R = \min_m F_{lm}^R \quad \text{[Equation 7]}$$

The reliability integration unit 173 calculates an integration reliability $J_l$ as the reliability of the feature point by linearly combining the contour reliability $S_l$ calculated by the contour reliability calculation unit 171 with the appearance difference $F_l$ calculated by the appearance difference calculation unit 172. The integration reliability part $J_l$ is represented by the following Equation 8.

$$J_l = \alpha F_l + \beta S_l$$

In Equation 8, $\alpha$ and $\beta$ are constants that are preliminarily set in the reliability integration unit 173 to cause the value $\alpha$ to be increased as the appearance in the license plate is clearer, and the value $\beta$ to be decreased as the contour is clearer. For example, a user of the information processing device 100 may preliminarily set the following values $\alpha$ and $\beta$ in the reliability calculation unit 170.

When the appearance is clear, the difference between classes is more dispersed than when the appearance is not clear. Thus, for example, as shown in Equation 9, $\alpha$ may be set to a value that increases as the dispersion increases.

$$\alpha = \frac{\sum_R \|D_l^R - D_0\|_2}{D_1} \quad \text{[Equation 9]}$$

In Equation 9, $D_0$ and $D_1$ represent predetermined constants.

On the other hand, as the maximum value of the integral value $T_l$ increases, the contour becomes clearer. Thus, for example, as shown in Equation 10, the value $\beta$ may be set to be decreased as the maximum value of $T_l$ increases.

$$\beta = -\max_l T_l \quad \text{[Equation 10]}$$

The feature point estimation unit 180 selects (estimates) from the feature point hypotheses, an estimated feature point (candidate of the feature point), that is a feature point hypothesis with a maximum integration reliability $J_l$, or a predetermined number of feature point hypotheses from higher integration reliability $J_l$. Further, the feature point estimation unit 180 executes registration of the degraded image (or the reference image) and the target image by using the selected feature point (candidate of the feature point). Note that the technique for registration in the feature point estimation unit 180 is not particularly limited. For example, the feature point estimation unit 180 may use the registration technique disclosed in PTL 2. In the registration process, the feature point estimation unit 180 may deform an image as needed.

As described above, the feature point estimation unit 180 may select one group of feature points (feature point hypothesis), or may select a predetermined number of feature point hypotheses. When a plurality of feature point hypotheses are selected, the feature point estimation unit 180 executes registration for each of the feature point hypothesis.

The feature point estimation unit 180 may display a result of the registration on a display device which is not shown, or may transmit the registration result to a device which is not shown.

Note that, for example, the information processing device 100 may transmit the integration reliability calculated by the reliability calculation unit 170 to a device (not shown) which has transmitted the target image. In this case, the information processing device 100 need not include the feature point estimation unit 180.

Note that in this example embodiment, the image degradation unit 160 generates the degraded images for all the feature point hypotheses generated by the feature point sampling unit 120. Then, the reliability calculation unit 170 calculates the reliabilities for all the degraded images. However, this example embodiment is not limited to this.

For example, the reliability calculation unit 170 may discard the feature point hypothesis whose reliability is predictable as being apparently small among the feature point hypotheses generated by the feature point sampling unit 120, and omits the reliability calculation. Further, the reliability calculation unit 170 may notify the image degradation unit 160 of the feature point hypothesis to be discarded, and makes the image degradation unit 160 omit the generation of degraded images.

For example, when an assumed camera position for capturing the posture calculated from the feature point hypothesis is greatly different from the actual camera capturing position, the reliability calculation unit 170 may discard the feature point hypothesis. As a more specific example, a case where a rectangular object, such as a license plate, is captured from a far distance will be described. When the rectangular object is captured from a far distance, this object has a shape similar to a parallelogram on the image. Accordingly, when the shape acquired based on the feature point hypothesis is greatly different from parallelogram, the reliability calculation unit 170 may discard the feature point hypothesis.

The method for discarding the feature point hypothesis is not limited to the above-described method. For example, when the value of the contour reliability calculated by the contour reliability calculation unit 171 is considerably small, the reliability calculation unit 170 may discard the feature point hypothesis before the appearance difference calculation unit 172 calculates the appearance difference.

[Description of Operation]

Next, the operation of the information processing device 100 according to this example embodiment will be described with reference to the drawings.

Figure 3:
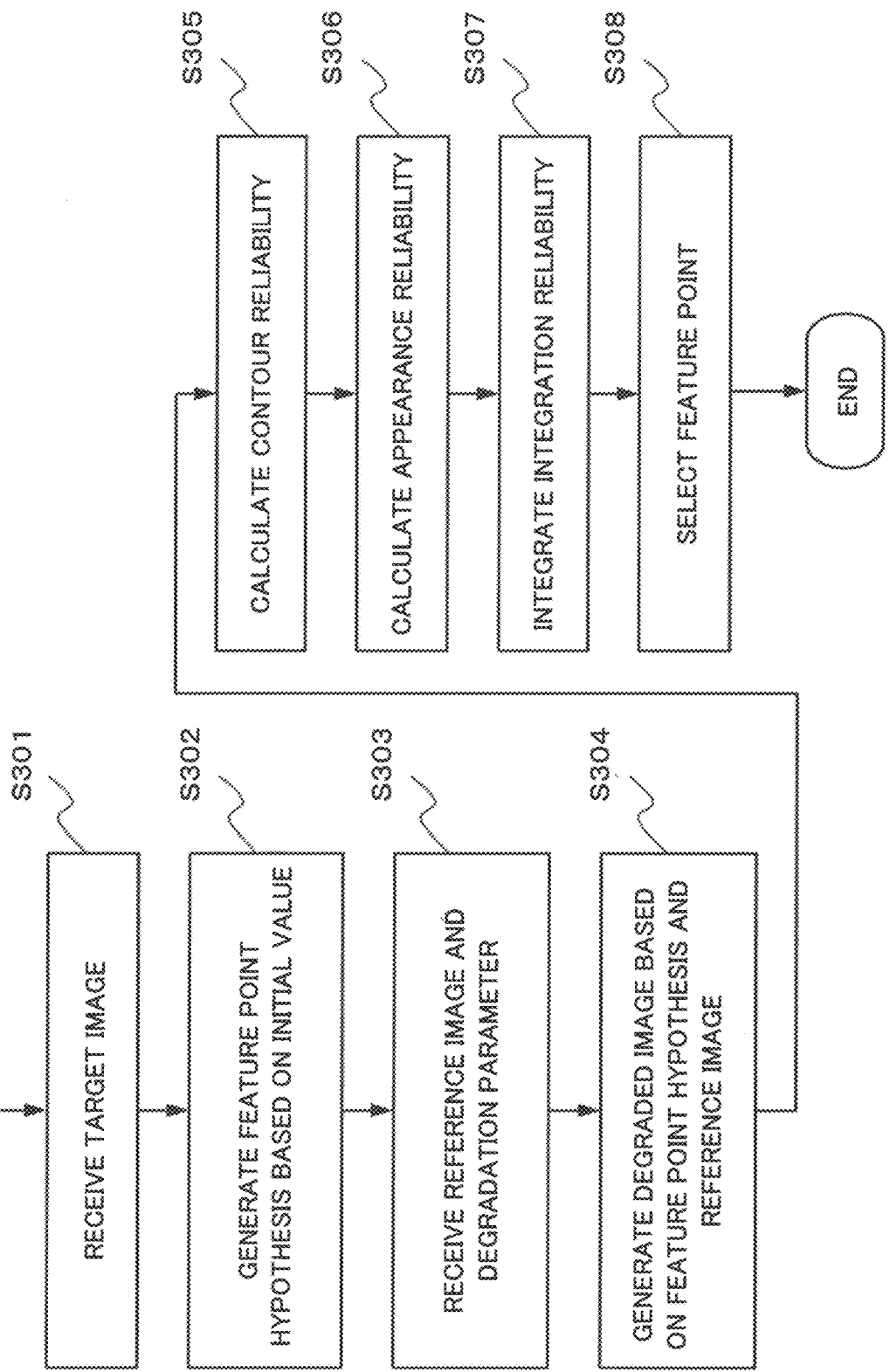
FIG. 3 is a flowchart illustrating an example of an operation of the information processing device according to the first example embodiment.

FIG. 3 is a flowchart illustrating an example of the operation of the information processing device 100 according to this example embodiment.

First, the target image reception unit 110 receives a target image (step S301).

Next, the feature point sampling unit 120 receives an initial value of a feature point, and generates a feature point hypothesis based on the initial value (step S302).

The reference image reception unit 140 and the degradation parameter reception unit 150 receive a reference image and a degradation parameter, respectively (step S303).

Next, the image degradation unit 160 generates a degraded image based on the feature point hypothesis and the reference image (step S304).

Next, the contour reliability calculation unit 171 calculates a contour reliability (step S305).

The appearance difference calculation unit 172 calculates an appearance difference (step S306).

The reliability integration unit 173 calculates an integration reliability by integrating the contour reliability and the appearance difference (step S307).

The feature point estimation unit 180 selects a feature point hypothesis (a group of feature points) with a high reliability (step S308). Note that the selection corresponds to an estimation of a feature point.

[Description of Advantageous Effects]

Next, advantageous effects of the first example embodiment will be described.

The information processing device 100 of this example embodiment can provide an advantageous effect that high accuracy registration is achieved even when a low-resolution image, a compressed image, or an image with a lot of noise is used, or even when there are many variations of patterns of captured objects. In other words, the information processing device 100 can provide an advantageous effect that registration is achieved even when the patterns of the target image and the reference image are complicated.

There are the following reasons for the above.

The feature point sampling unit 120 generates the feature point hypothesis based on the initial value of the feature point and the target image. The image degradation unit 160 generates the degraded image by degrading the reference image based on the feature point hypothesis, the reference image, and the degradation parameter. The reliability calculation unit 170 calculates the reliability of the feature point hypothesis based on the target image, the feature point hypothesis, and the degraded image. The feature point estimation unit 180 selects the feature point hypothesis with a high reliability, that is, the candidate of the feature point.

That is, the information processing device 100 uses the target image and the degraded image acquired by degrading the reference image. Accordingly, the information processing device 100 can calculate the accurate reliability even when the pattern distribution of the target image is greatly different from the pattern distribution of the reference image. That is, the information processing device 100 can perform high accuracy registration even when there are many variations of patterns.

Further, the information processing device 100 uses combinations of the degraded images of all the reference images in a necessary range and all the degradation parameters (such as a posture) in a necessary range. Accordingly, the information processing device 100 can find the posture of the target image even when there are many variations of patterns.

As a result, the information processing device 100 can achieve high accuracy registration of images. In other words, the information processing device 100 can perform high accuracy registration of low-resolution images having a high compression ratio or a lot of noise.

Second Example Embodiment

An information processing device 101 according to a second example embodiment uses an identifier (ID) identifying the reference image. This example embodiment will be described below with reference to the drawings.

[Description of Configuration]

Figure 4:
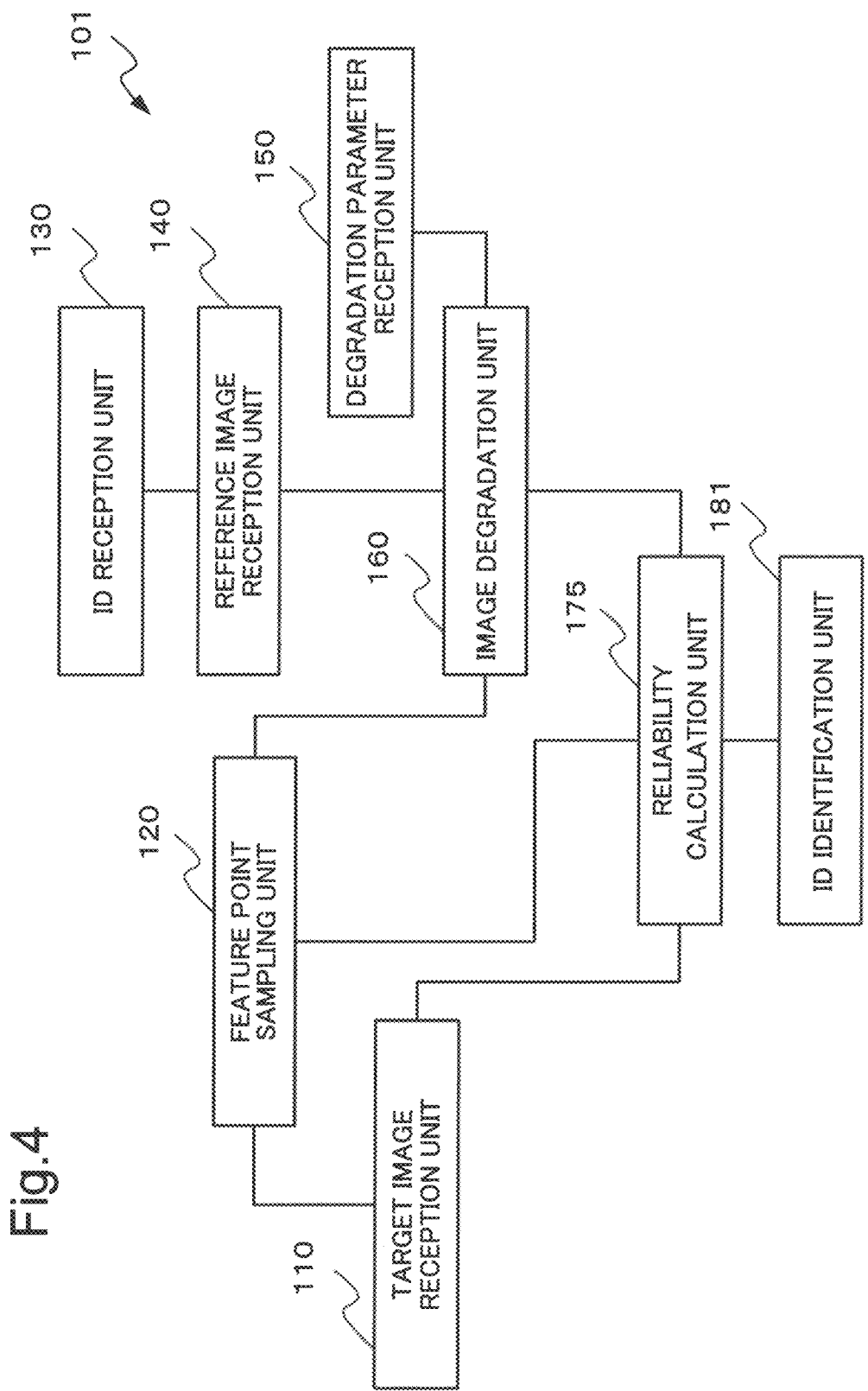
FIG. 4 is a block diagram illustrating an example of a configuration of an information processing device according to a second example embodiment.

FIG. 4 is a block diagram illustrating an example of the configuration of the information processing device 101 according to the second example embodiment.

The information processing device 101 includes a reliability calculation unit 175 and an ID identification unit 181 instead of the reliability calculation unit 170 and the feature point estimation unit 180 of the information processing device 100 of the first example embodiment, and further includes an ID reception unit 130. This configuration will be described below, but the configuration of this example embodiment is not limited to the above configuration. For example, the information processing device 101 may include the feature point estimation unit 180.

The descriptions of the configuration and operation similar to those of the first example embodiment are omitted as needed, and the configuration and operation that are specific to this example embodiment are mainly described below.

The ID reception unit 130 receives an ID (identifier) for distinguishing the reference image. In this example embodiment, the ID is not particularly limited. For example, when the reference image is a face of a person, the ID may be an ID for identifying an individual (e.g., an employee ID number or a membership number). Alternatively, when the reference image is a license plate, the number of the license plate may be used as the ID.

The ID received by the ID reception unit 130 is associated with the reference image. For example, the reference image reception unit 140 may associate the ID with the reference image. Alternatively, the ID reception unit 130 may associate the ID with the reference image received by the reference image reception unit 140. Note that the reference image received by the reference image reception unit 140 may include the ID. In this case, the information processing device 101 need not include the ID reception unit 130.

The reliability calculation unit 175 operates in the same manner as the reliability calculation unit 170 of the first example embodiment. Further, the reliability calculation unit 175 calculates a score K(n) as described below.

Figure 5:
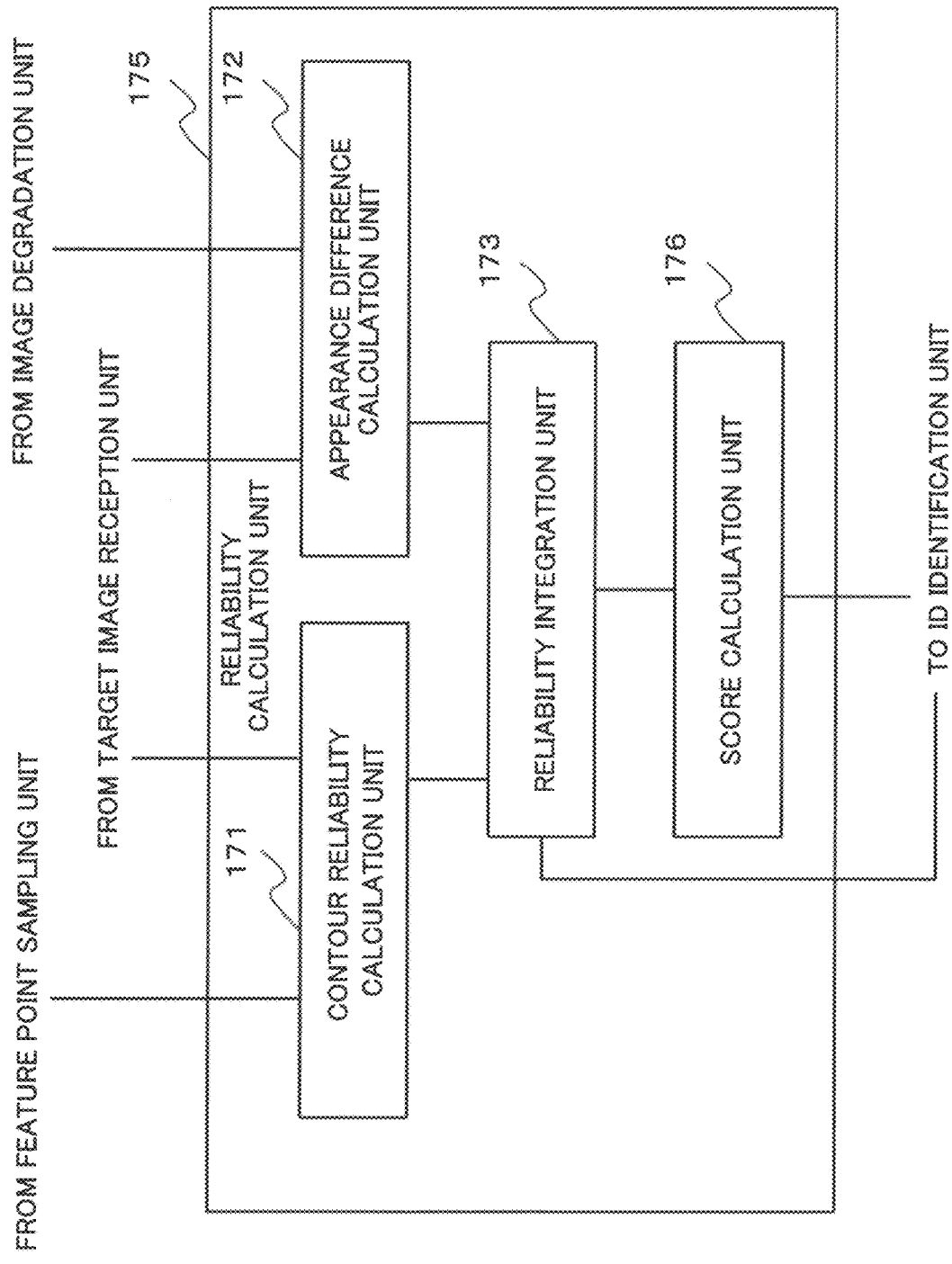
FIG. 5 is a block diagram illustrating an example of a configuration of a reliability calculation unit according to the second example embodiment.

FIG. 5 is a block diagram illustrating an example of the configuration of the reliability calculation unit 175 according to the second example embodiment.

The reliability calculation unit 175 includes the contour reliability calculation unit 171, the appearance difference calculation unit 172, the reliability integration unit 173, and a score calculation unit 176. However, the configuration of the reliability calculation unit 175 is not limited to this.

The contour reliability calculation unit 171, the appearance difference calculation unit 172, and the reliability integration unit 173 operate in the same manner as those of the first example embodiment. Accordingly, the score calculation unit 176 will be described.

First, the score calculation unit 176 calculates a score $V_{lm}^{R}$ as shown in the following Equation 11 by linearly combining the appearance difference $F_{lm}^{R}$ and the contour reliability $S_l$.

$$V_{lm}^{R} = \alpha F_{lm}^{R} + \beta S_l \qquad \text{[Equation 11]}$$

In Equation 11, $\alpha$ and $\beta$ are linear combination constants that are similar to those described above regarding Equation 8 in the first example embodiment. As is obvious from the comparison between Equation 11 and Equations 6 to 8, the integration reliability $J_1$ in Equation 8 and the score $V_{lm}^R$ in Equation 11 are different in the following point. The integration reliability $J_1$ uses a minimum value of the appearance difference $F_{lm}^R$. On the other hand, the score $V_{lm}^R$ uses $F_{lm}^R$.

Next, the score calculation unit 176 calculates the score K(n) by using the IDs relating to the reference images with the top k of the scores $V_{lm}^R$ generated by linearly combining the integration reliabilities (k number of reference images from higher values in the integration reliability). Here, k represents a value that is preliminarily set by a user of the information processing device 101. The score K(n) is a value calculated in such a way that the score of the ID becomes higher as the IDs associated with (linked to) the selected reference images with top-level range are biased (e.g., biased to a certain ID). For example, the score calculation unit 176 may calculate the score K(n) of each reference image by using the following Equation 12. K(n) shown in Equation 12 executes weighted voting with a weight $w_j$ on the IDs associated with reference images with the top k score.

$$K(n) = \sum_{j=1}^{k} \delta(n_j, n) \cdot w_j \quad \text{[Equation 12]}$$

In Equation 12, n represents the ID (this ID also represents a class) of each reference image. $n_j$ represents the ID of the reference image with the level of j from the top. $\delta(\cdot,\cdot)$ represents a function that takes "1" when the two argument values match and takes "0" in the other cases. The weight $w_j$ used for weighted voting is a coefficient for giving a weight set to the level of j, and $w_j$ is defined as shown in, for example, the following Equation 13.

$$w_j = k - j \quad \text{[Equation 13]}$$

In this manner, the score calculation unit 176 calculates the score of each reference image in such a way that the score becomes higher as the number of deviations of the integration reliability with respect to the higher-level reference images becomes larger.

The ID identification unit 181 operates in the same manner as the feature point estimation unit 180 of the first example embodiment. In other words, the ID identification unit 181 is a modification of the feature point estimation unit.

Further, the ID identification unit 181 selects the reference image which has the ID with the maximum score K(n) calculated by the reliability calculation unit 175. In other words, the ID identification unit 181 selects the reference image with a large deviation.

Then, the ID identification unit 181 executes registration based on the target image, the selected feature point hypothesis, and the selected reference image (or the degraded image relating to the reference image).

[Description of Operation]

Next, the operation of the information processing device 101 according to this example embodiment will be described with reference to the drawings.

Figure 6:
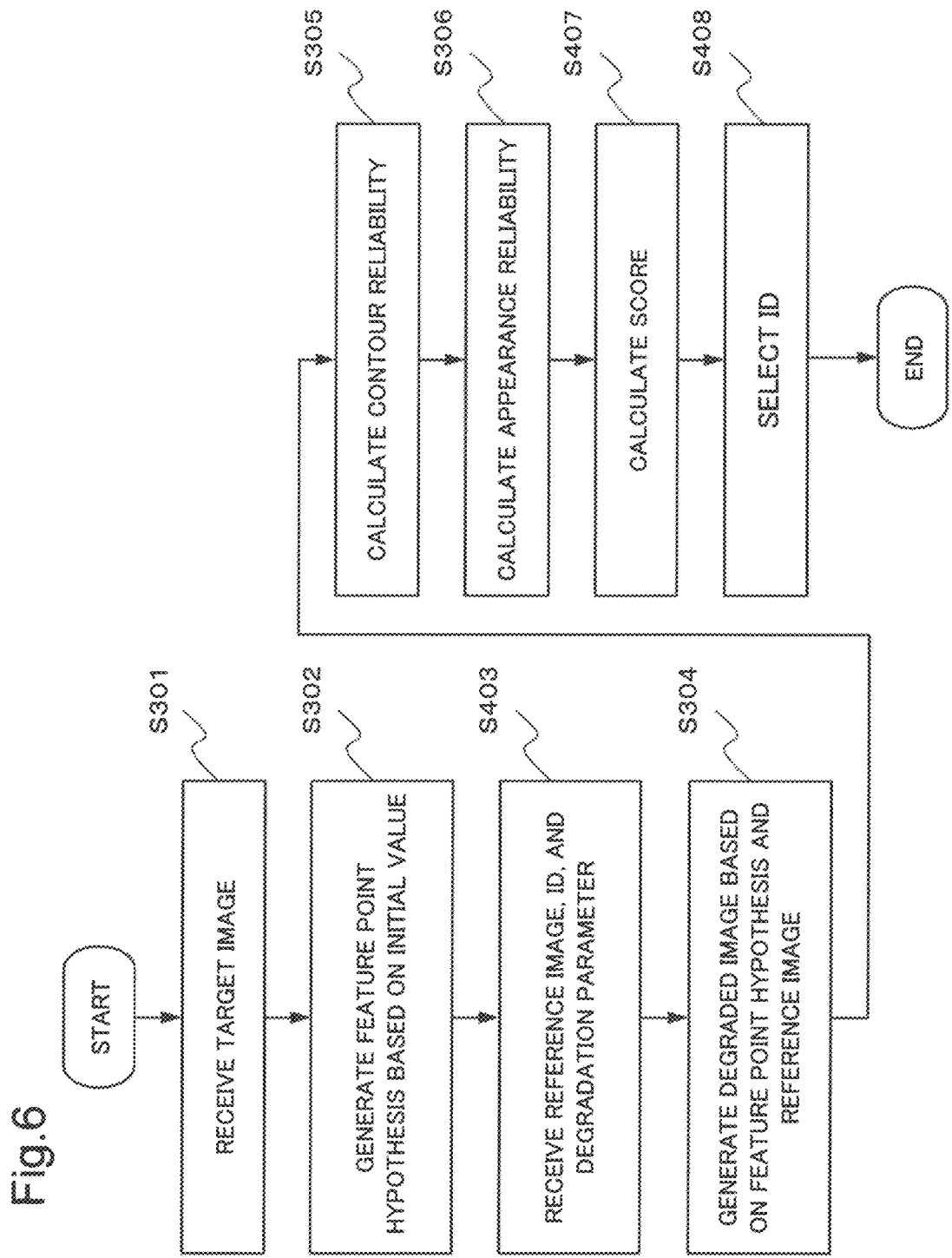
FIG. 6 is a flowchart illustrating an example of an operation of the information processing device according to the second example embodiment.

FIG. 6 is a flowchart illustrating an example of the operation of the information processing device 101 according to the second example embodiment.

Detailed descriptions of the operation similar to that of the first example embodiment are omitted as needed.

Steps S301 to S302 are the same operations as those of the first example embodiment.

In step S403, the ID reception unit 130 receives the ID. Further, like in step S303, the reference image reception unit 140 and the degradation parameter reception unit 150 receive the reference image and the degradation parameter.

Steps S304 to S306 are the same operations as those of the first example embodiment.

Then, the reliability calculation unit 175, after calculating the integration reliability, calculates the score K(n) (step S407).

The ID identification unit 181 selects the ID (reference image) with a highest score (step S408).

[Description of Advantageous Effects]

Next, advantageous effects of this example embodiment will be described.

The information processing device 101 of this example embodiment can achieve, in addition to the advantageous effects of the first example embodiment, an advantageous effect that the ID of the reference image can be identified even when the patterns of the reference images are complicated.

This is because the information processing device 101 of this example embodiment associates the ID with the reference image.

Furthermore, the information processing device 101 uses the score K(n) based on the deviation of the IDs.

Third Example Embodiment

An information processing device 102 according to a third example embodiment restores an image (restoration image) relating to a target image. Hereinafter, this example embodiment will be described below with reference to the drawings.

[Description of Configuration]

Figure 7:
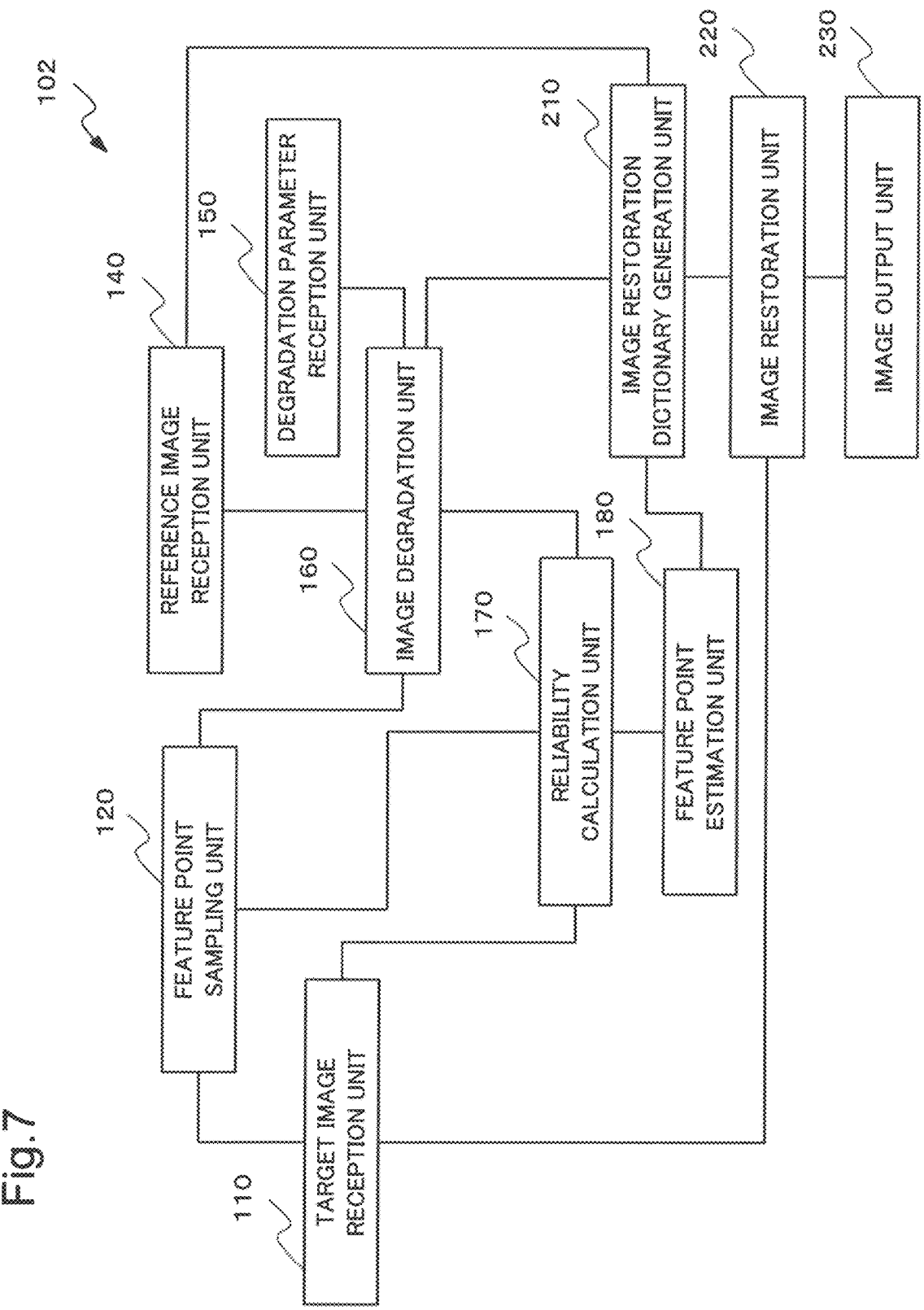
FIG. 7 is a block diagram illustrating an example of a configuration of an information processing device according to a third example embodiment.

FIG. 7 is a block diagram illustrating an example of the configuration of the information processing device 102 according to the third example embodiment.

The information processing device 102 includes an image restoration dictionary generation unit 210, an image restoration unit 220, and an image output unit 230, in addition to the elements of the information processing device 100 of the first example embodiment. In the following description, this example embodiment will be described with this configuration. However, the configuration of this example embodiment is not limited to the above configuration. For example, the information processing device 102 may include the ID identification unit 181.

The descriptions of the configuration and operation similar to those of the first example embodiment are omitted as appropriate, and the configuration and operation that are specific to this example embodiment are mainly described below.

The image restoration dictionary generation unit 210 cuts out small regions (patches) which are located in relating positions from the reference image and the degraded image. Note that the size of the small region (patch) is preliminarily set in the image restoration dictionary generation unit 210. For example, a user of the information processing device 102 may preliminarily set the size of the small region (patch). Note that the small region is also called as a "local region."

Further, the image restoration dictionary generation unit 210 registers each of a group (patch pair) of the small regions in the reference image and the degraded image into a dictionary (not shown). For example, the image restoration dictionary generation unit 210 registers a patch pair of the feature vectors for each of the small regions into the dictionary as information about the group registered into the dictionary. However, the image restoration dictionary generation unit 210 cuts the small region among the regions of the feature point candidates selected (estimated) by the feature point estimation unit 180. That is, the image restoration dictionary generation unit 210 registers the small region (patch) among the regions of the feature point candidates into the dictionary.

Note that the image restoration dictionary generation unit 210 may normalize a size and lightness for the reference image. For example, the image restoration dictionary generation unit 210 may increase or reduce the number of reference pixels in the vertical and horizontal directions in such a way that the number of pixels is set to a predetermined value. Alternatively, the image restoration dictionary generation unit 210 may correct the contrast for the lightness based on a brightness value of a background color.

Here, the feature value registered in the dictionary is not particularly limited. For example, the feature vector stored in the dictionary may be defined as shown in Equation 14 using a vector $v=(v_1, v_2, \ldots, v_i, \ldots, v_n)$ which is acquired by arranging the brightness values relating to the small region in a raster-scan order and a weight vector $w=(w_1, w_2, \ldots, w_i, w_n)$. Note that "n" in Equation 14 represents the dimension of the feature vector $\Psi$.

$$\Psi = (\phi_1, \phi_2, \ldots, \phi_i, \ldots, \phi_n) \quad \text{[Equation 14]}$$

$$\phi_i = \frac{w_i \bullet v_i}{\sqrt{\sum_{j=1}^{n} (w_j \bullet v_j)^2}}$$

In Equation 14, the weight vector $w_i$ in the i-th pixel in the small region represents a weight for preferentially selecting small regions in which values of lightness at the center of the small regions are similar, when the small regions are selected. The weight $w_i$ is defined as shown in the following Equation 15 using a pixel i, a distance $r_i$ from the center of the small region, and a parameter $\rho$ for determining an attenuation rate of the weight.

$$w_i = \exp(-\rho^{-1} \cdot r_i^2) \quad \text{[Equation 15]}$$

The image restoration unit 220 searches the small regions used for restoration from the generated dictionary based on the difference of the feature vector associated with (linked to) the small region for each pixel of the target image. Then, the image restoration unit 220 synthesizes the pixel value based on the weighted average of a plurality of relating small regions, which are searched, for each pixel of the restoration image, and generates the restoration image relating to the target image.

The image output unit 230 outputs the restored restoration image to a device (e.g., a display device) which is not shown. The image output unit 230 may include a display device and display the restoration image.

[Description of Operation]

Next, the operation of this example embodiment will be described with reference to the drawings.

Figure 8:
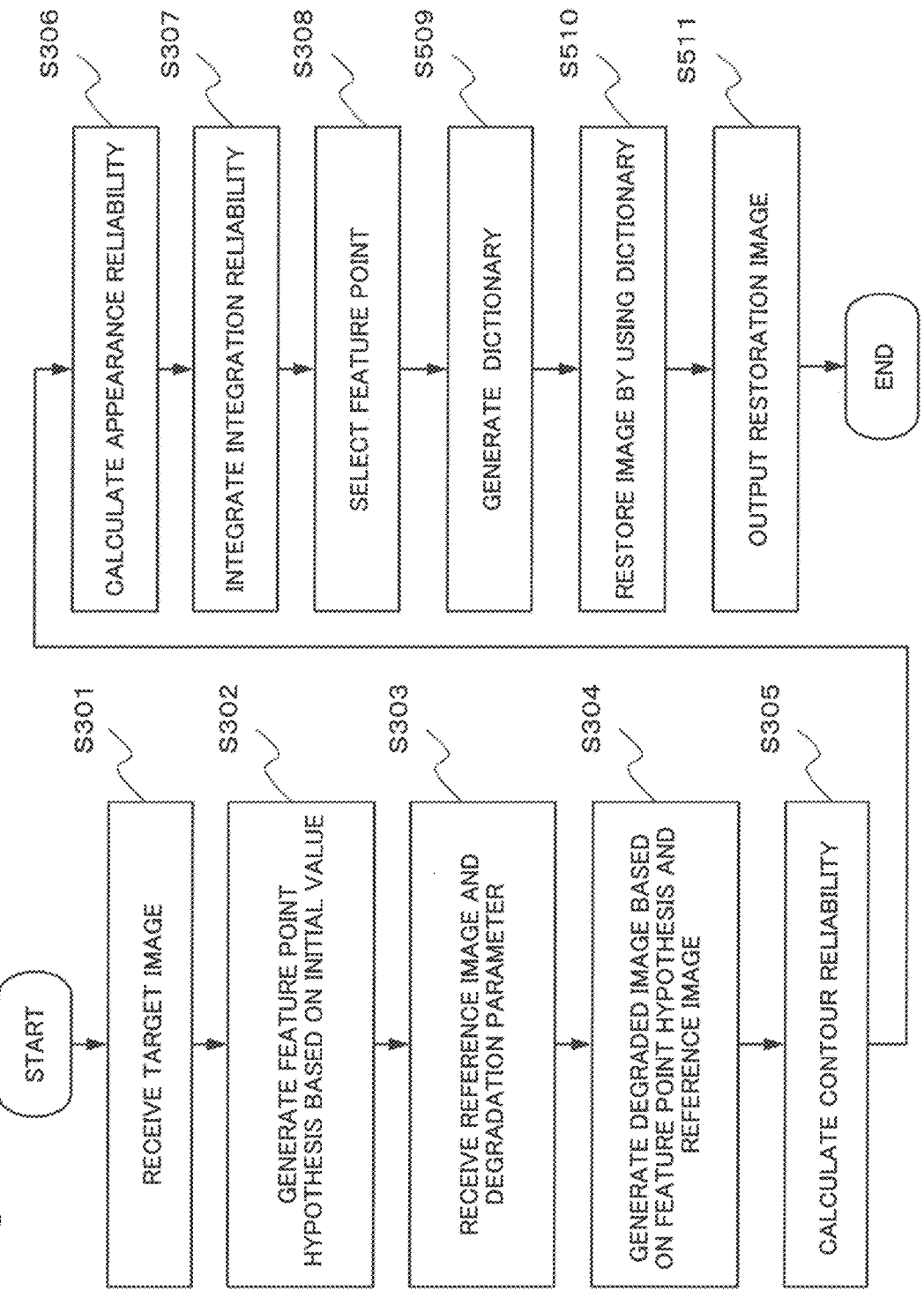
FIG. 8 is a flowchart illustrating an example of an operation of the information processing device according to the third example embodiment.

FIG. 8 is a flowchart illustrating an example of the operation of the information processing device 102 according to the third example embodiment.

Detailed descriptions of the operation similar to that of the first example embodiment will be omitted as needed.

The information processing device 102 operates in the same manner as in steps S301 to S308 of the first example embodiment.

Then, the image restoration dictionary generation unit 210 generates the image restoration dictionary (step S509). That is, the image restoration dictionary generation unit 210 registers the above-mentioned group of small regions (patch pair) into the dictionary.

The image restoration unit 220 restores the restoration image relating to the target image as described above by using the image restoration dictionary (step S510).

The image output unit 230 outputs the restoration image (step S511).

[Description of Advantageous Effects]

Advantageous effects of this example embodiment will be described.

The information processing device 102 of this example embodiment can achieve an advantageous effect of performing high-accuracy restoration of image, in addition to the advantageous effects of the first example embodiment.

This is because the information processing device 102 can perform high-accuracy registration of image as similar as the first example embodiment, and the information processing device 102 restores the image by using the dictionary for image restoration relating to high-accuracy positions. Accordingly, the information processing device 102 is capable of restoring the image with high accuracy.

Fourth Example Embodiment

The configuration of the information processing device 100 to the information processing device 102 described above will be described as a fourth example embodiment. The information processing device 100 to the information processing device 102 are configured with the following configuration.

For example, each of the units of the information processing device 100 to the information processing device 102 may be configured with a hardware circuit.

Alternatively, the information processing device 100 to the information processing device 102 may be configured by using a plurality of information processing devices in which each of units is connected via a network, a bus, or the like (hereinafter referred to as "a network or the like").

Figure 9:
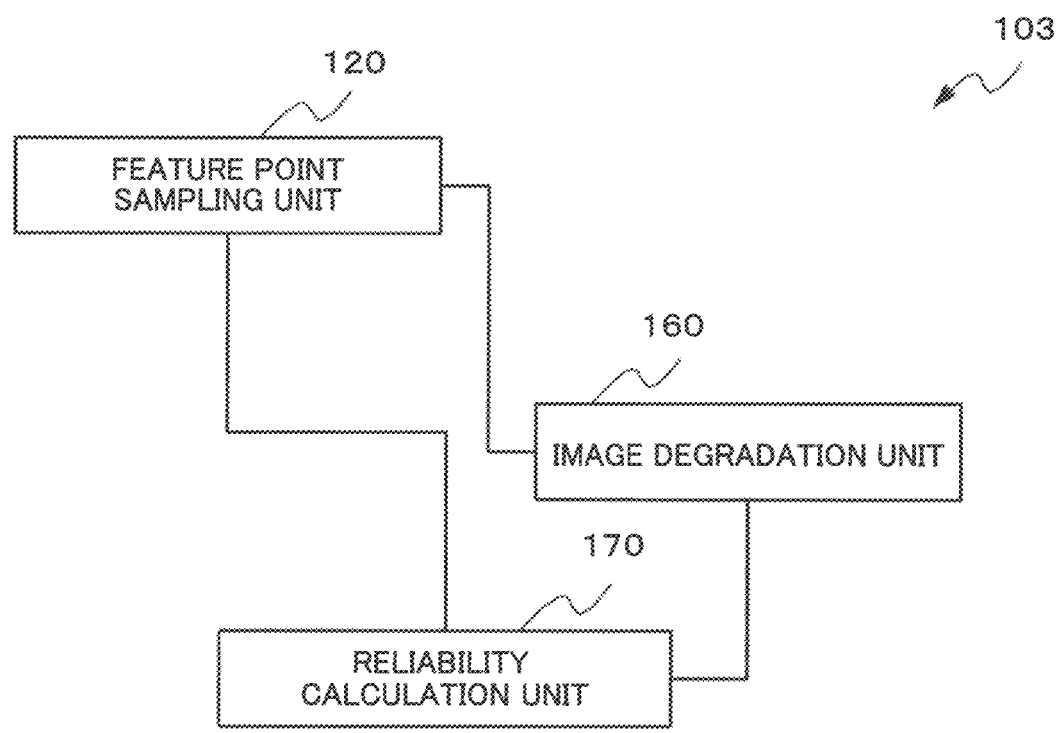
FIG. 9 is a block diagram illustrating an example of a configuration of an information processing device according to a fourth example embodiment.

FIG. 9 is a block diagram illustrating an example of a configuration of an information processing device 103 according to this example embodiment.

The information processing device 103 includes the feature point sampling unit 120, the image degradation unit 160, and the reliability calculation unit 170.

Each of the elements of the information processing device 103 operates in the same manner as the elements of the information processing device 100.

The feature point sampling unit 120 samples the feature point hypothesis.

The image degradation unit 160 generates the degraded image based on the feature point hypothesis, the degradation parameter, and the reference image.

The reliability calculation unit 170 calculates the reliability of the feature point hypothesis based on the target image, the degraded image, and the feature point hypothesis.

The information processing device 103 configured as above-mentioned can achieve the advantageous effects of the information processing device 100.

This is because, as described above, each of the elements of the information processing device 103 operates in the same manner as the element of the information processing device 100, and appropriately calculates the reliability of the feature point hypothesis based on the target image and the degraded image of the reference image.

Note that the information processing device 103 according to this example embodiment is a minimum configuration of the present invention.

Fifth Example Embodiment

Another configuration of the information processing device 100 to the information processing device 103 (hereinafter referred to as "the information processing device 100 or the like") will be described as a fifth example embodiment. The information processing device 100 or the like may be configured with one hardware for a plurality of units.

Alternatively, the information processing device 100 or the like may be realized as a computer device including a CPU (Central Processing Unit), a ROM (Read Only Memory), and a RAM (Random Access Memory). Further, the information processing device 100 or the like may be realized as a computer device including an input/output circuit (IOC) and a network interface circuit (NIC) in addition to the elements described above.

Figure 14:
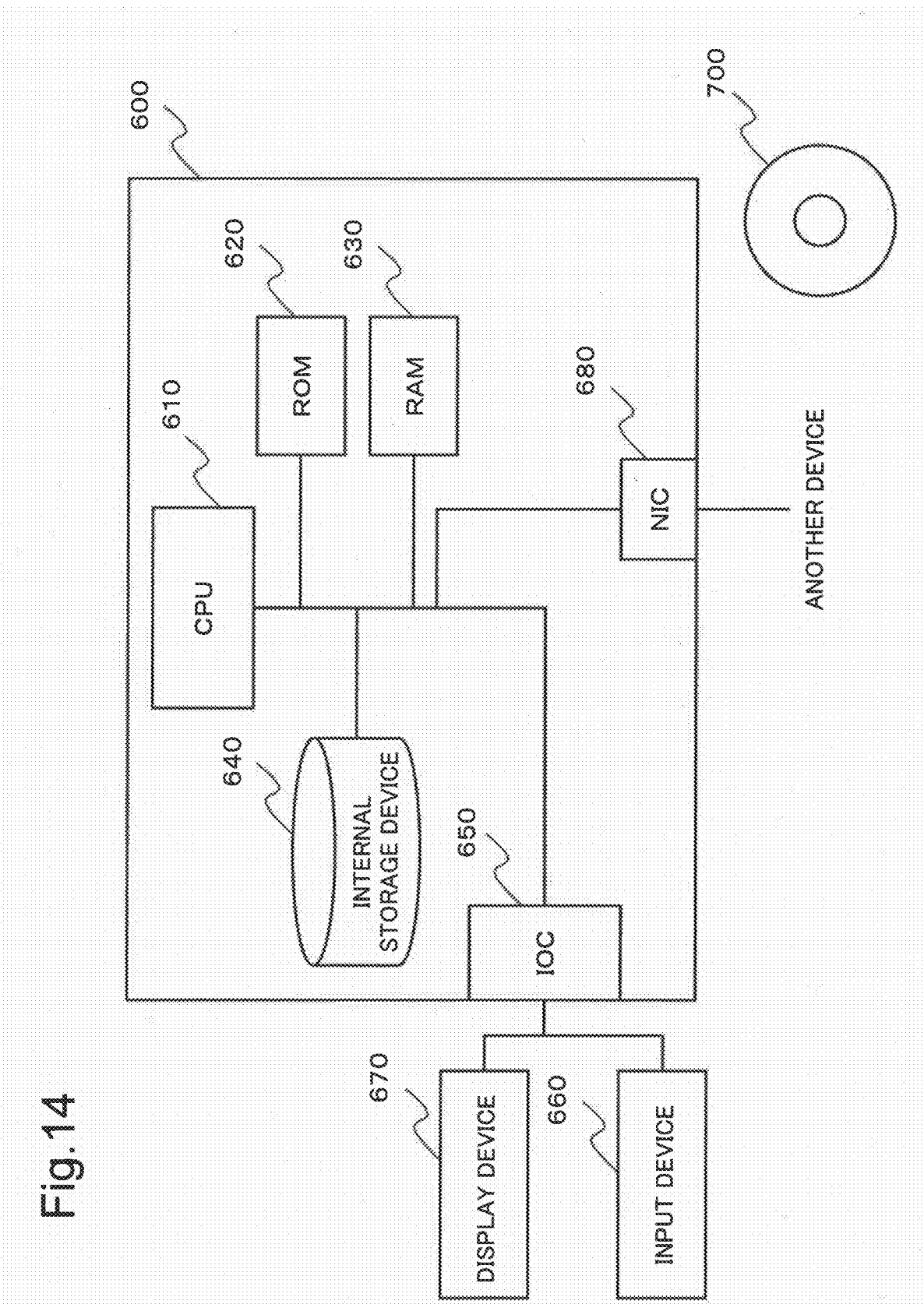
FIG. 14 is a block diagram illustrating an example of a configuration of an information processing device according to a fifth example embodiment.

FIG. 14 is a block diagram illustrating an example of a configuration of an information processing device 600 according to the fifth example embodiment which is a modified example of the information processing device 100 or the like.

The information processing device 600 includes a CPU 610, a ROM 620, a RAM 630, an internal storage device 640, an IOC 650, and an NIC 680, and constitutes a computer device.

The CPU 610 reads a program from the ROM 620. Then, the CPU 610 controls the RAM 630, the internal storage device 640, the IOC 650, and the NIC 680 based on the read program.

Then, the computer including the CPU 610 controls these elements, and realizes each of functions as the units shown in FIG. 1, 4, 7, or 9. The unis shown in FIG. 1 are the target image reception unit 110, the feature point sampling unit 120, the reference image reception unit 140, the degradation parameter reception unit 150, the image degradation unit 160, the reliability calculation unit 170, and the feature point estimation unit 180. The units shown in FIG. 4 are the target image reception unit 110, the feature point sampling unit 120, the ID reception unit 130, the reference image reception unit 140, the degradation parameter reception unit 150, the image degradation unit 160, the reliability calculation unit 175, and the ID identification unit 181. The units shown in FIG. 7 are the image restoration dictionary generation unit 210, the image restoration unit 220, and the image output unit 230 in addition to the units shown in FIG. 1. The units shown in FIG. 9 are the feature point sampling unit 120, the image degradation unit 160, and the reliability calculation unit 170.

The CPU 610 may use the RAM 630 or the internal storage device 640 as a temporary storage of a program when realizing each of functions.

Alternatively, the CPU 610 may read a program stored in a storage medium 700, which computer-readably stores the program, by using a storage medium reading device which is not shown. Alternatively, the CPU 610 may receive a program from an external device, which is not shown, through the NIC 680, store the received program in the RAM 630, and operate based on the stored program.

The ROM 620 stores a program executed by the CPU 610 and fixed data. The ROM 620 is, for example, a P-ROM (Programmable-ROM) or a flash ROM.

The RAM 630 temporarily stores a program executed by the CPU 610 and data. The RAM 630 is, for example, a D-RAM (Dynamic-RAM).

The internal storage device 640 stores data and a program that are stored by the information processing device 600 for a long period of time. The internal storage device 640 may operate as a transitory storage device for the CPU 610. The internal storage device 640 is, for example, a hard disk device, a magneto-optical disk device, an SSD (Solid State Drive), or a disk array device.

The ROM 620 and the internal storage device 640 are non-transitory storage media. The RAM 630 is a transitory storage medium. The CPU 610 is operable based on a program stored in the ROM 620, the internal storage device 640, or the RAM 630. In other words, the CPU 610 is operable by using a non-transitory storage medium or a transitory storage medium.

The IOC 650 mediates data between the CPU 610, and an input device 660 and a display device 670. The IOC 650 is, for example, an IO interface card or a USB (Universal Serial Bus) card.

The input device 660 is a device that receives an input instruction from the operator of the information processing device 600. The input device 660 is, for example, a keyboard, a mouse, or a touch panel.

The display device 670 is a device for displaying information to the operator of the information processing device 600. The display device 670 is, for example, a liquid crystal display.

The NIC 680 relays an exchange of data with an external device, which is not shown, via a network. The NIC 680 is, for example, a LAN (Local Area Network) card.

The information processing device 600 configured as described above achieves the advantageous effects similar to those of the information processing device 100 or the like.

This is because the CPU 610 of the information processing device 600 is capable of realizing same functions of the information processing device 100 or the like based on a program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-205007, filed on Oct. 3, 2014, the disclosure of which is incorporated herein in its entirety by reference.

REFERENCE SIGNS LIST

100 Information processing device
101 Information processing device
102 Information processing device
103 Information processing device
110 Target image reception unit
120 Feature point sampling unit
130 ID reception unit
140 Reference image reception unit
150 Degradation parameter reception unit
160 Image degradation unit
170 Reliability calculation unit 171 Contour reliability calculation unit
172 Appearance difference calculation unit
173 Reliability integration unit
175 Reliability calculation unit
176 Score calculation unit
180 Feature point estimation unit
181 ID identification unit
210 Image restoration dictionary generation unit
220 Image restoration unit
230 Image output unit
600 Information processing device
610 CPU
620 ROM
630 RAM
640 Internal storage device
650 IOC
660 Input device
670 Display device
680 NIC
700 Storage medium

What is claimed is:

1. An information processing device comprising:
a memory; and
at least one processor coupled to the memory,
the processor performing operations, the operations comprising:
receiving a target image from a capture device;
receiving a reference image;
receiving a degradation parameter from an input device;
based on an initial value of a feature point used for registration of an object included in the target image to be processed, generating feature point hypotheses that are groups of a plurality of the feature points in the target image;
generating a degraded image by degrading the reference image, based on the feature point hypotheses and the degradation parameter;
calculating a reliability of each feature point hypothesis, based on the target image, the degraded image, and each feature point hypothesis;
selecting one of the feature point hypotheses by using the reliabilities, and executing registration of the target image and the degraded image by using the feature point included in the selected feature point hypothesis; and
generating a restoration image associated with the target image, based on the registration of the target image.

2. The information processing device according to claim 1, wherein
the reliability of the feature point hypothesis is calculated by:
calculating a contour reliability when the feature point hypothesis is used for a target contour in the target image;
calculating an appearance difference between the target image and the degraded image; and
calculating, as a reliability of the feature point, an integration reliability based on the contour reliability and the appearance difference.

3. The information processing device according to claim 2, wherein
the reliability of the feature point hypothesis is calculated by:
calculating a score representing an extent of deviation for the reference image whose integration reliability is included in a predetermined top-level range.

4. The information processing device according to claim 3, wherein the operations further comprise:
selecting one or a predetermined number of the reference images and the degraded images associated with the reference images by using the reliabilities, and executing registration of the selected images.

5. The information processing device according to claim 4, wherein the operations further comprise:
receiving an identifier for distinguishing the reference image, wherein
calculating the score by using the identifier.

6. An information processing method comprising:
based on an initial value of a feature point used for registration of an object included in a target image to be processed, generating feature point hypotheses that are groups of a plurality of the feature points in the target image;
generating a degraded image by degrading a reference image, based on the feature point hypotheses and a degradation parameter;
calculating a reliability of each feature point hypothesis, based on the target image, the degraded image, and each feature point hypothesis;
selecting one of the feature point hypotheses by using the reliabilities, and executing registration of the target image and the degraded image by using the feature point included in the selected feature point hypothesis; and
generating a restoration image associated with the target image, based on the registration of the target image.

7. A non-volatile computer-readably recording medium embodying a program, the program causing a computer to perform a method, the method comprising:
based on an initial value of a feature point used for registration of an object included in a target image to be processed, generating feature point hypotheses that are groups of a plurality of the feature points in the target image;
generating a degraded image by degrading a reference image, based on the feature point hypotheses and a degradation parameter;
calculating a reliability of each feature point hypothesis, based on the target image, the degraded image, and each feature point hypothesis;
selecting one of the feature point hypotheses by using the reliabilities, and executing registration of the target image and the degraded image by using the feature point included in the selected feature point hypothesis; and
generating a restoration image associated with the target image, based on the registration of the target image.

* * * * *